US005534581A

United States Patent [19]

Ohtani et al.

[11] Patent Number: 5,534,581

[45] Date of Patent: Jul. 9, 1996

[54] TRANSFER MATERIAL CARRYING MEMBER AND IMAGE FORMING APPARATUS MAKING USE OF THE SAME

[75] Inventors: Noriko Ohtani; Naoto Fujimura, both of Yokohama; Kiyoshi Sakai, Hachioji; Teigo Sakakibara, Yokohama; Masahiro Inoue, Yokohama; Nobuhiko Takekoshi, Yokohama; Shinya Mayama, Yamato; Hideo Ohtaki, Toyonaka; Tadami Kinugawa, Toyonaka; Toshiaki Takada, Toyonaka; Yuichi Hashimoto, Tokyo, all of Japan

[73] Assignee: Canon Kabushiki Kaisha, Tokyo, Japan

[21] Appl. No.: 395,185

[22] Filed: Feb. 27, 1995

Related U.S. Application Data

[63] Continuation of Ser. No. 227,985, Apr. 15, 1994, abandoned, which is a continuation of Ser. No. 858,408, Mar. 27, 1992, abandoned.

[30] Foreign Application Priority Data

Mar. 28, 1991 [JP] Japan .................................... 3-064795
Jan. 30, 1992 [JP] Japan .................................... 4-038457

[51] Int. Cl.[6] .............................. C08K 3/04; C08K 3/22; H01B 1/24; H01B 1/20

[52] U.S. Cl. ......................... 524/430; 524/408; 524/413; 524/495; 524/496; 524/497; 252/511; 252/520

[58] Field of Search .................................... 524/439, 440, 524/441, 430, 431, 432, 433, 495, 496, 847, 497, 408, 413; 252/511, 520

[56] References Cited

U.S. PATENT DOCUMENTS 4,464,497 8/1984 Belfoure .................................. 524/496

FOREIGN PATENT DOCUMENTS 60-10625 1/1985 Japan .

OTHER PUBLICATIONS

Patent Abstracts of Japan, vol. 6, No.82 (P-116) (960) May 20, 1982.

Patent Abstracts of Japan, vol. 6, No.84 (P-117) (962) May 22, 1982.

Patent Abstracts of Japan, vol. 14, No.66 (P-1003) Feb. 7, 1990.

*Primary Examiner*—Peter A. Szekely
*Attorney, Agent, or Firm*—Fitzpatrick, Cella, Harper & Scinto

[57] ABSTRACT

A transfer material carrying member has a copolymer and conductive particles; the copolymer has a component unit represented by the Formula (I) and a component unit represented by the Formula (II), and the component unit represented by Formula (II) is in an amount of from 0.1% by weight to 50% by weight based on the total weight of the copolymer.

27 Claims, 4 Drawing Sheets

TRANSFER MATERIAL CARRYING MEMBER AND IMAGE FORMING APPARATUS MAKING USE OF THE SAME

This application is a continuation of application Ser. No. 08/227,985, filed Apr. 15, 1994, now abandoned; which in turn, is a continuation of application Ser. No. 07/858,408 filed Mar. 27, 1992, now abandoned.

BACKGROUND OF THE INVENTION

1. Field of the Invention

The present invention relates to a transfer material carrying member and an image forming apparatus. More particularly, it is concerned with a transfer material carrying member used when a toner image formed by electrophotography or electrostatic recording is transferred to a transfer material, and an image forming apparatus having such a transfer material carrying member. The image forming apparatus herein includes black and white, monochromatic or full-color electrophotographic copying machines, printers and other various recording apparatus.

2. Related Background Art

Various members are known as transfer material carrying members used when an image on an image bearing member is transferred to a transfer material. For example, in an electrophotographic apparatus having an image forming means comprised of the steps of charging, imagewise exposure, toner development, transfer and cleaning, a means for transferring a toner image on a photosensitive member to a transfer material as exemplified by paper may include a transfer drum and a transfer device as shown in FIGS. 1 and 2, respectively.

A transfer drum 10 comprises a support comprised of cylinders 12 and 13 provided on its both ends and a connecting part 14 that connects these cylinders. A transfer material carrying member 11 is so provided on this support as to extend through an opening made in its peripheral wall. The connecting part 14 is provided with a transfer material gripper 15 that holds a transfer material fed from a paper feeder. A transfer charge assembly 21, and an internal charge-eliminating discharge assembly 23 and external charge-eliminating discharge assemblies 22 and 24 that constitute a charge-eliminating means are also provided inside and outside the transfer drum 10.

In the transfer step, various mechanical and electrical external forces are applied to the transfer material carrying member 11 during transport of transfer materials, transfer charging, charge elimination, cleaning and so forth, and hence the transfer material carrying member is required to endure to such external forces, that is, to have mechanical strength, wear resistance and electrical durability as well as an excellent surface lubricity to a cleaning member or the like.

Films of resins such as Teflon, polyester, polyvinylidene fluoride, triacetate and polycarbonate have been hitherto used as transfer material carrying members. When, however, these resin films are used as transfer material carrying members, release discharge occurs when a transfer material is released from a photosensitive drum immediately after transfer, so that the transfer material is statically charged because of this release discharge. The charges thus produced can not escape anywhere and are held by the transfer material and the transfer material carrying member, often bringing about disorder of toner images on the transfer material or non-uniform charging for the subsequent transfer. On such occasions, it has been necessary to strictly set transfer conditions, e.g., to precisely control transfer current values or to eliminate residual charges on the transfer material carrying member by means of reverse charging or AC charging.

To solve such problems, Japanese Patent Application Laid-open No. 60-10625 discloses a method in which carbon black is dispersed in a resin film used as a transfer material carrying member, to arbitrarily control volume resistance of the resin film.

Such a carbon-dispersed film, however, tends to have a relatively low transparency, and hence use of this film as a transfer material carrying member in an image forming apparatus may give a limitation on the position at which an optical sensor is provided. Accordingly, studies have been made on transfer material carrying members having a higher light transmittance.

In recent years, it has become popular to use in a developer what is called small-diameter toner particles, having particle diameters of 10 μm or less and an average particle diameter of about 8 μm, in order to make a latent image highly detailed so that images can have a higher image quality, and in order to improve reproduction of such a latent image. Hence, the toner particles tend to pick up a very slight uneven potential produced on a transfer material carrying member in the transfer step. Thus, studies have been also made on transfer material carrying members that do not tend to cause charge nonuniformity.

SUMMARY OF THE INVENTION

An object of the present invention is to provide a transfer material carrying member that has solved the above problems and can give always good images, and an image forming apparatus making use of such a transfer material carrying member.

The present invention provides a transfer material carrying member comprising a copolymer and conductive particles;

said copolymer being a copolymer having a component unit represented by the following Formula (I):

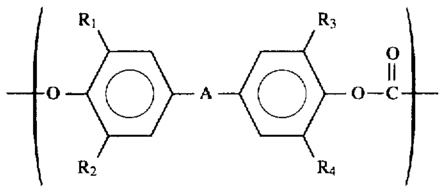

(I)

wherein A represents a straight-chain, branched or cyclic alkylidene group having 1 to 10 carbon atoms, an aryl-substituted alkylidene group, an arylenedialkylidene group, —O—, —S—, —CO—, —SO— or $SO_2$; and $R_1$, $R_2$, $R_3$ and $R_4$ each represent a hydrogen atom, a halogen atom, an alkyl group having 1 to 4 carbon atoms, or an alkenyl group, and a component unit represented by the following Formula (II):

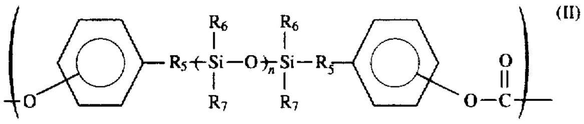

(II)

wherein $R_5$ represents an alkylene group having 2 to 6 carbon atoms, or an alkylidene group; $R_6$ and $R_7$ each represent an alkyl group having 1 to 3 carbon atoms, a phenyl group or a substituted phenyl group; and n represents an integer of 1 to 200; and said component unit represented by Formula (II) being in an amount of from 0.1% by weight to 50% by weight based on the total weight of said copolymer.

The present invention also provides an image forming apparatus comprising the transfer material carrying member described above.

DETAILED DESCRIPTION OF THE PREFERRED EMBODIMENTS

Figure 1:
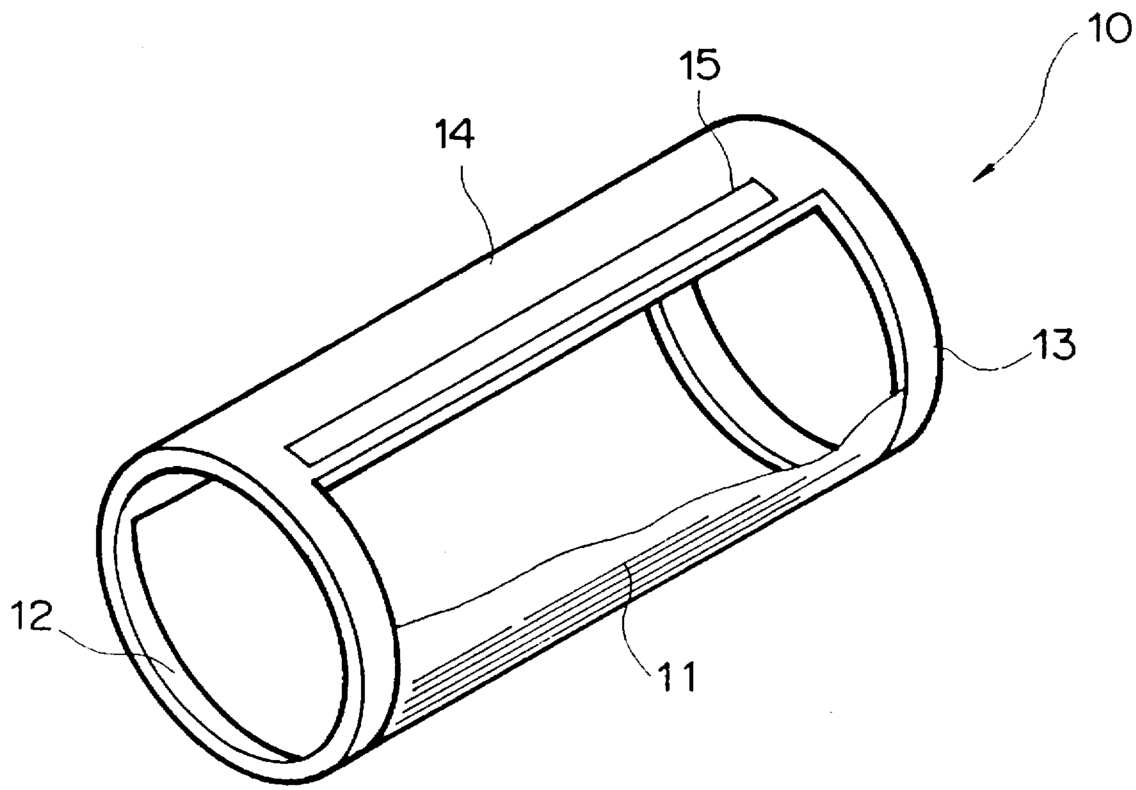
FIG. 1 is a schematic illustration of the construction of a transfer drum having the transfer material carrying member of the present invention.

The transfer material carrying member of the present invention comprises a copolymer having the component units respectively represented by Formulas (I) and (II) described above, and conductive particles.

The copolymer used in the present invention can be obtained by subjecting a bisphenol having the structure represented by the following Formula (III):

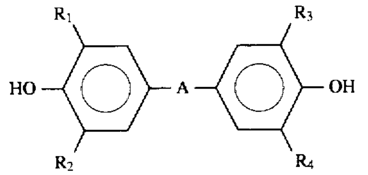

(III)

wherein $R_1$ to $R_4$ are as defined above, and a bisphenol having the structure represented by the following Formula (IV):

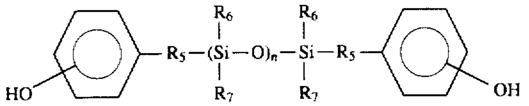

(IV)

wherein $R_5$ and $R_7$ are as defined above, to interfacial polymerization in the presence of phosgene, a carbonate or a chloroformate.

The copolymer may preferably have a viscosity average molecular weight of from 10,000 to 50,000, and particularly preferably from 20,000 to 40,000.

In the present invention, the component unit represented by Formula (II) is in an amount of from 0.1 to 50% by weight, and preferably from 0.1 to 30% by weight, based on the total weight of the copolymer. The letter symbol n represents an integer of from 1 to 200, and preferably from 5 to 100. The group represented by $R_5$ may include ethylene, propylene, isopropylene, burylane, pentylene and hexylene, and particularly preferably ethylene, propylene and isopropylene.

The bisphenol represented by Formula (IV) can be readily synthesized by subjecting a phenol having an olefinic unsaturated carbon-carbon bond, preferably vinyl phenol, allylphenol or isopropenylphenol, to hydrosilanation reaction on terminals of a polysiloxane chain having a given degree of polymerization (n).

Examples of the bisphenol represented by Formula (III) are shown below. This bisphenol used in the present invention is by no means limited to these. Exemplary Compound No.

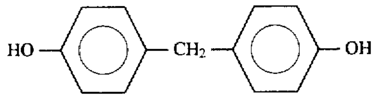

1

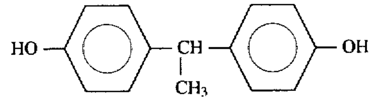

2

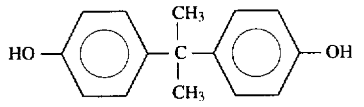

3

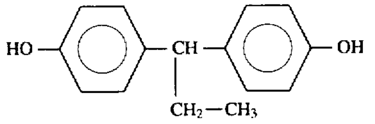

4

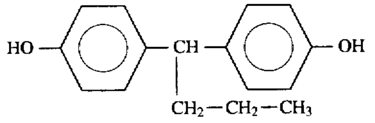

5

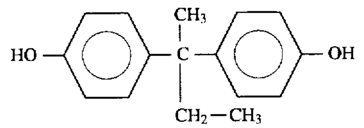

6

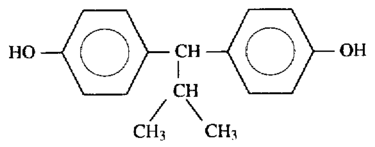

7

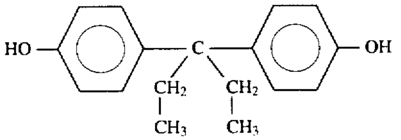

8

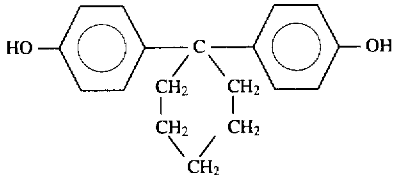

9

-continued
10
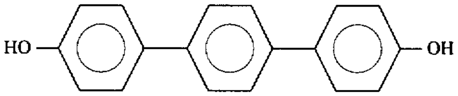
11
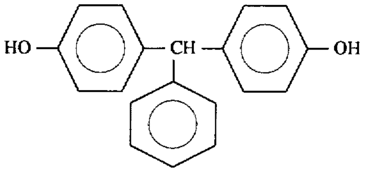
12
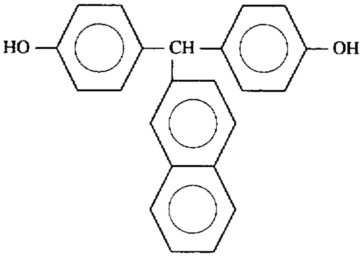
13
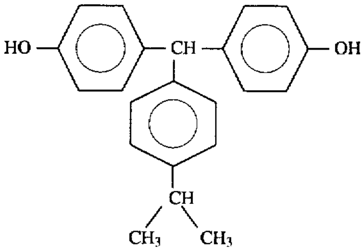
14
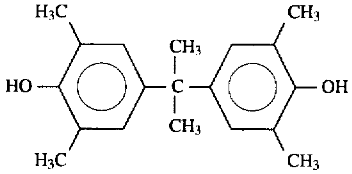
15
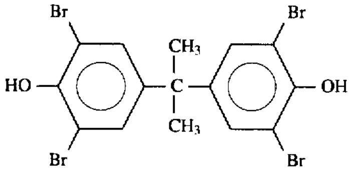
16
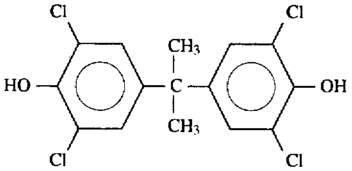
17
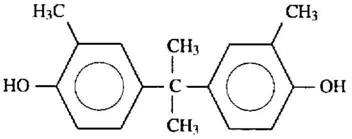
18
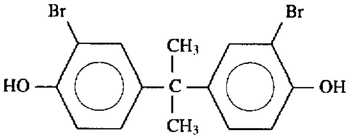
-continued
19
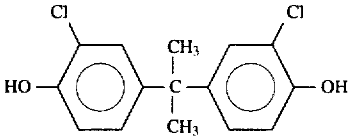
20
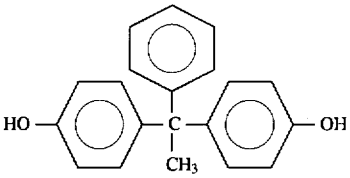
21
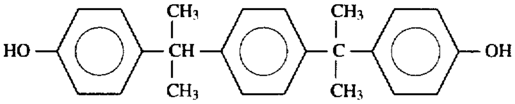
22
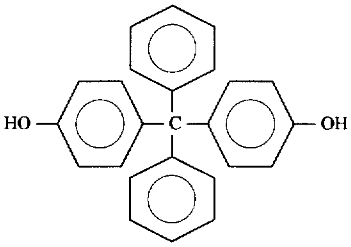
23
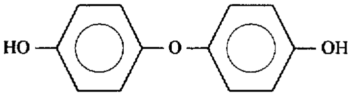
24
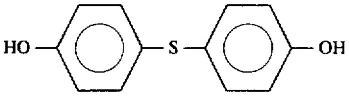
25
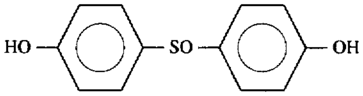
26
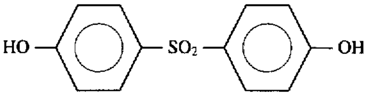
27
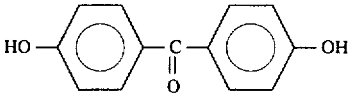
Of the above compounds, Exemplary Compounds Nos. 3, 4, 9, 17, 20 and 22 are particularly preferred. Of these, Exemplary Compounds Nos. 3 and 9 ape more particularly preferred.
Examples of the bisphenol represented by Formula (IV) are shown below. Examples are by no means limited to these.
28
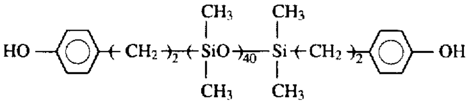
29
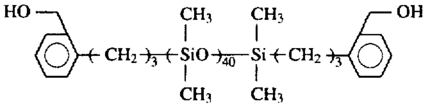

-continued

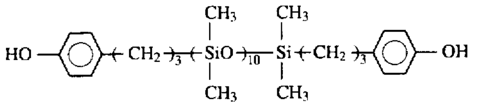
30

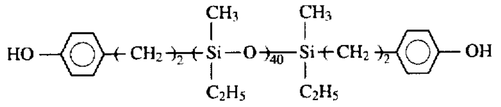
31

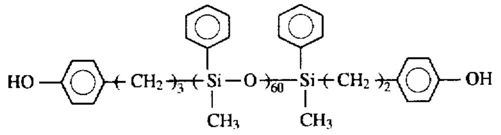
32

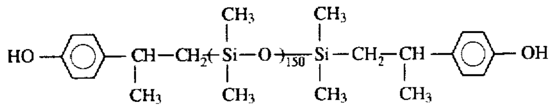
33

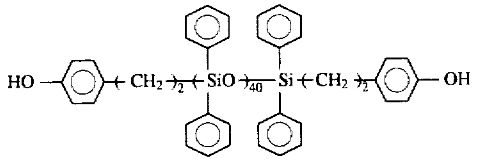
34

When the copolycarbonate resin of the present invention as a copolymer is synthesized, a chain terminator or a molecular weight modifier may be used. These may include compounds having a monovalent phenolic hydroxyl group, as exemplified by usual phenols, p-tertiary-butylphenol and tribromophenol, as well as long-chain alkylphenols, aliphatic carboxylic acid chlorides, aliphatic carboxylic acids, hydroxybenzoic acid alkyl esters, hydroxyphenyl alkyl acid esters and alkyl ether phenols. These may preferably be used in an amount of from 100 to 0.5 mol, and particularly preferably from 50 to 2 mols based on 100 mols of all the divalent phenolic compounds used. In the present invention, two or more compounds of any of these may be used in combination. In the present invention, a branching agent may also be added in an amount of from 0.01 to 3 mol %, and particularly preferably from 0.1 to 1.0 mol %, in approximation based on the bisphenol described above, to give a branched polycarbonate. The branching agent may include fluoroglycine, polyhydric compounds such as 2,6-dimethyl-2,4,6-tri(4-hydroxyphenyl)heptene-3,4,6-dimethyl- 2,4,6-tri(4-hydroxyphenyl)heptene-2,1,3,5-tri(2-hydroxyphenyl)benzole, 1,1,1-tri(4-hydroxyphenyl)ethane, 2,6-bis(2-hydroxy-5-methylbenzyl)-4-methylphenol and α,α'α"-tri(4-hydroxyphenyl)-1,3,5-triisopropylbenzene, and 3,3-bis(4-hydroxyaryl)oxyindole (i.e., isatin bisphenol), 5-chloroisatin, 5,7-dichloroisatin, and 5-bromoisatin.

The copolymer of the present invention may contain two or more kinds of the component unit represented by Formula (I), and two or more kinds of the component unit represented by Formula (II).

Monomer components other than the component units represented by Formulas (I) and (II) may also be copolymerized together.

The copolymer of the present invention may also be used in the form of a mixture with other resins.

Various additives conventionally usable in polycarbonate resins may also be added to the copolycarbonate resin of the present invention. Such additives may include reinforcing agents, antioxidants, fillers, stabilizers, ultraviolet absorbents, antistatic agents, lubricants, release agents, dyes, pigments and other flame-retardants or elastomers for improving impact resistance. For example, preferable stabilizers are phosphorous acid and phosphites. Preferable release agents are esters of mono- or polyhydric alcohols of saturated fatty acids as exemplified by stearyl stearate, behenyl behenate, pentaerythritol tetrastearate, and dipentaerythritol hexaoctoate.

A synthesis example of the copolymer resin used in the present invention will be described below.

Synthesis Example

In 45 lit. of water, 3.8 kg of sodium hydroxide was dissolved. While the solution was kept at 20° C., 7.2 kg of 2,2-bis(4-hydroxyphenyl)propane, 1.3 kg of polydimethylsiloxane terminated at its both ends with 2-(4-hydroxyphenyl)ethyl groups and having siloxane chains in an average repeating number n of 40 (X-22-165B; available from Shin-Etsu Chemical Co., Ltd.) and 8 g of hydrosulfite were dissolved.

To the resulting solution, 32 lit. of methylene chloride was added and, with stirring, 158 g of p-t-butylphenol was further added. Subsequently, 3.5 kg of phosgene was blown through the mixture over a period of 60 minutes. After the phosgene was blown through, the reaction mixture was emulsified by vigorously stirring. After the emulsification, 8 g of triethylamine was added, followed by continuous stirring for about 1 hour to complete polymerization.

The polymerized solution was separated into an aqueous layer and an organic layer, and the organic layer was neutralized using phosphoric acid. Thereafter, 35 lit. of isopropanol was added to precipitate a polymerized product, and then the precipitate was filtered, followed by drying to give a copolymer of the present invention.

The conductive particles used in the present invention may include conductive carbon black, metal particles, metal oxide particles and conductive resin particles. Conductive carbon black and metal oxide particles are particularly preferred.

The conductive particles may preferably have a particle diameter of not more than 1 μm, and particularly not more than 0.3 μm, from the viewpoint of their optical characteristics. The particles may also preferably have a volume resistivity of not higher than 100 Ω.cm, and particularly not higher than 70 μm.

The conductive particles may preferably be contained in an amount of from 0.1 to 300 parts by weight based on 100 parts by weight of the transfer material carrying member of the present invention.

The conductive particles can be blended by conventionally known methods. For example, a copolycarbonate powder of the present invention and the conductive particles may be simply blended. Melt-kneading may be in either a batch system or a continuous system.

The conductive carbon black may include, for example superconductive furnace black, conductive furnace black, extraconductive furnace black, superabrasion furnace black and fibril carbon. The conductive carbon black may preferably be added in an amount of from 0.1 to 30 parts by weight based on 100 parts by weight of the transfer material carrying member of the present invention.

The metal oxide particles may include powders as exemplified by titanium oxide, indium oxide, zinc oxide, tin oxide, antimony oxide, bismuth oxide, indium oxide doped with tin, tin oxide doped with antimony, and zirconium oxide. Such metal oxide powder may be used alone or in the form of a mixture of two or more kinds. In the case when two or more kinds of powder are mixed, they not only may be simultaneously used but also may be used in the form of a solid solution or a fused solid. The metal oxide powder in the present invention may be contained in an amount of from 1 to 300 parts by weight, and particularly from 3 to 100 parts by weight, based on 100 parts by weight of the transfer material carrying member.

The metal oxide powder may also be treated with a treating agent such as an organic silicate, an organic titanate or a polyorganosiloxane, and may be treated by either the dry process or the wet process. In the wet process, the powder is immersed in a low-boiling solvent solution of the treating agent followed by removal of the solvent. In the dry process, the powder and the treating agent are mixed in a mixing machine such as Henschel mixer, a super mixer or a V-type blender, or the powder is sprayed with an organic solvent of the treating agent to make adhesion, further optionally followed by heat treatment at 100° to 250° C. This treatment can be effective for moderating a lowering of molecular weight when the copolycarbonate resin of the present invention is melted.

The conductive resin may include polyaniline, polythiophene, and polyacetylene.

The copolycarbonate resin used in the present invention has very good dispersion properties compared with resins conventionally used as transfer material carrying members, and hence the conductive particles cab be uniformly dispersed in a larger quantity than ever.

For this reason, also when the copolymer used in the present invention is made into a resin film in which the conductive particles have been dispersed, resistance uneveness can be made very small over a wide range and also the resistance can be controlled with ease.

The conductive particle-dispersed resin used in the present invention can be molded into a sheet by extrusion or injection molding. The resin sheet thus formed may preferably have a volume resistivity of from $1\times10^2$ Ω.cm to $1\times10^{17}$ Ω.cm, and a specific dielectric constant of not less than 2.5. It may be in the form of a sheet, or in the form of an endless belt comprised of a sheet whose ends are bonded by heat sealing, ultrasonic sealing, adhesive bonding or the like means. It may be made to have any desired most preferable form depending on the forming apparatus to which it is applied. The thickness of the sheet may vary depending on the volume resistivity or specific dielectric constant, and may preferably be in the range of from 50 μm to 300 μm, and particularly from 70 μm to 200 μm.

Use of such a sheet in the transfer material carrying member makes it possible to obtain an always uniform, stable transfer electric field and obtain a good image free from uneven transfer, even when toner images are superposingly transferred as in the formation of a multi-color image. The transfer material carrying member of the present invention is particularly effective also when what is called the small-diameter toner is used, which tends to be affected by uneven potential produced on the transfer material carrying member.

The copolycarbonate resin used in the present invention has so good a surface lubricity and surface strength that the surface can be free from wear, showing a good cleaning performance, even when a cleaning means such as a cleaning blade or a cleaning brush is used.

Thus, even when electrical and mechanical external forces are applied during transfer charging, charge elimination, paper feeding, cleaning and so forth, the transfer material carrying member of the present invention is durable during repeated use because of its durability to these external forces, i.e., its superior electrical durability, mechanical strength end wear resistance.

As a result, good transfer can always be carried out during its repeated use, and stable end good images can always be obtained.

The conductive particles used in the present invention may preferably be metal oxide powder, that is, as previously described, having a number average particle diameter of not mope than 1 μm, and particularly not more than 0.3 μm.

In the present invention, since the conductive particles are dispersed in the copolycarbonate resin having superior particle dispersion properties, the particles to be dispersed can be uniformly dispersed without causing their agglomeration, so that a conductive particle-dispersed copolycarbonate resin sheet also having a higher light transmittance and a superior conductivity uniformity can be obtained. Hence, when this sheet is used as a transfer material carrying member in an image forming apparatus, the transfer material carrying member can be provided without limitations on the position at which an optical sensor is set up. Moreover, since the transfer material carrying member has a high light transmittance, a jam-detecting sensor can be positioned inside the transfer material carrying member, so that there is another advantage that the jam-detecting sensor does not tend to be soiled with toner or paper dust.

The image forming apparatus of the present invention will be described below with reference to FIGS. 3 and 4 which illustrate examples of the embodiment of the image forming apparatus having the transfer material carrying member of the present invention.

Figure 3:
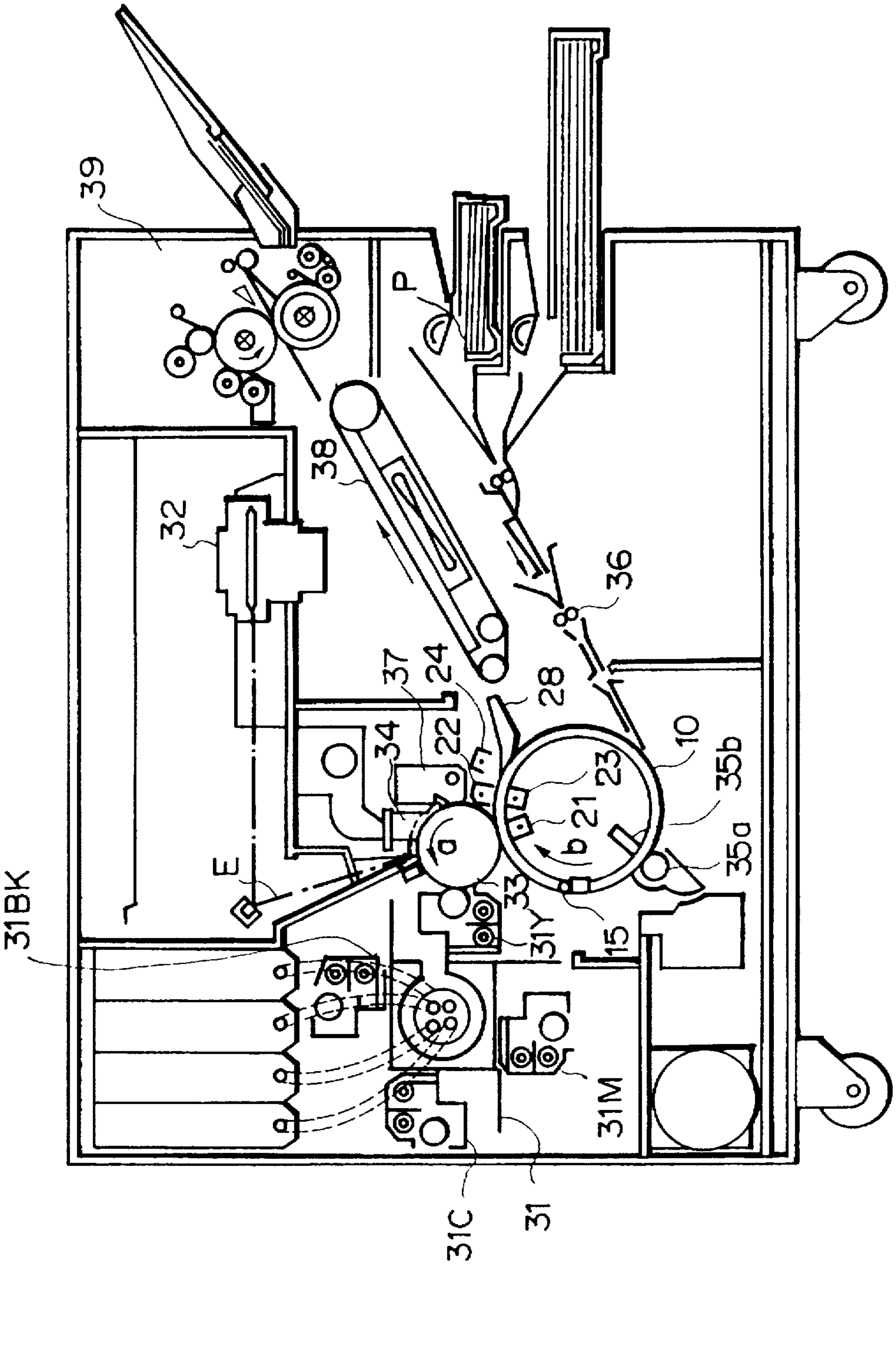
FIG. 3 is a schematic illustration of the construction of an image forming apparatus comprising a transfer drum having the transfer material carrying member of the present invention.
Figure 4:
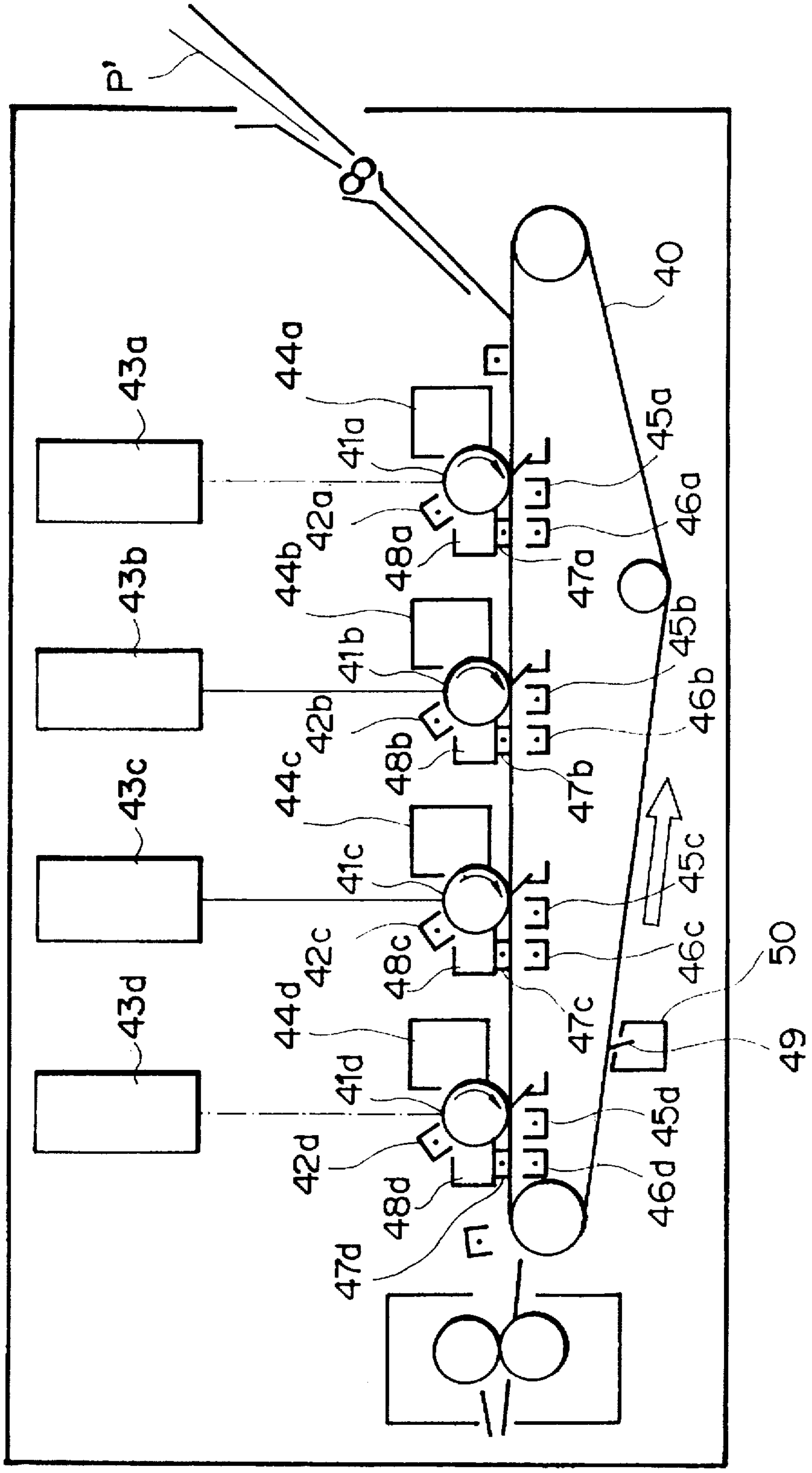
FIG. 4 is a schematic illustration of the construction of an image forming apparatus comprising an endless belt type transfer belt making use of the transfer material carrying member of the present invention.

Both the image forming apparatus shown in FIGS. 3 and 4 are examples of multi-color (full-color) image forming apparatus.

The image forming apparatus will be briefly described first with reference to FIG. 3. The multi-color electrophotographic copying machine shown in FIG. 3 is provided with an image bearing member, i.e., photosensitive drum 33 which is rotatably supported on an axis and is rotated in the direction of an arrow. An image forming means is provided on its circumferential zone. The image forming means may be of any means. In the present example, a primary charge assembly 34 that uniformly charges the photosensitive drum 33, an exposure means 32 comprised of, e.g., a laser beam exposure device that sheds a color-separated light image or a light image corresponding thereto to form an electrostatic latent image on the photosensitive drum 33, and a rotary developing device 31 that converts to a visible image the electrostatic latent image formed on the photosensitive drum 33 are employed.

The rotary developing device 31 is comprised of four sets of developing assemblies 31Y, 31M, 31C and 31Bk that contain four colors of developers, a yellow color developer, a magenta color developer, a cyan color developer and a black color developer, respectively, and a substantially cylindrical housing that holds these four sets of developing assemblies 31Y, 31M, 31C and 31Bk and is rotatably supported on an axis. The rotary developing device 31 is constructed in such a manner that the desired developing assembly is transported to the position opposed to the peripheral surface of the photosensitive drum 33 as the housing is rotated, and the electrostatic latent image on the photosensitive drum is developed so that full-color development corresponding to the four colors can be carried out.

The visible image on the photosensitive drum 33, i.e., a toner image, is transferred to a transfer material P carried on a transfer drum 10 and transported to a given position. In the present example, the transfer drum 10 is rotatably supported on an axis.

A process of forming a full-color image by the use of the multi-color electrophotographic copying machine constructed as described above will be briefly described below.

The surface of the photosensitive drum 33 is uniformly charged by the operation of the primary charge assembly 34, and is then exposed to light image E corresponding to image information by the exposure means 32, so that an electrostatic latent image is formed on the photosensitive drum 33. This electrostatic latent image is rendered visible as a toner image by a toner basically composed of a resin, fed from the rotary developing device 31.

As for the transfer material P, it is fed through resist rollers 36 to the transfer drum 10 synchronizingly with the image formation, held with a gripper 15 on its leading edge, and then transported by this transfer drum 10 in the direction of an arrow shown in the drawing.

Next, in a zone in which the transfer drum 10 comes into contact with the photosensitive drum 33, the transfer drum 10 is corona-discharged from the back of a transfer material carrying member 11 in a polarity reverse to that of the toner by the operation of a transfer discharge assembly 21, so that the toner image on the photosensitive drum 33 is transferred to the transfer material P.

The transfer material P, on which the transfer steps have been repeated a necessary number of times, is subjected to charge elimination by the operation of charge-eliminating discharge assemblies 22, 23 and 24, and concurrently separated from the transfer drum 10 by the action of a separating claw 28. The transfer material thus separated is sent on a transport belt 38 to a fixing assembly 39 and subjected to heat fixing, and then outputted to the outside of the machine.

Meanwhile, the photosensitive drum 33 is cleaned by means of a cleaning device 37 to remove the toner remaining on the surface, and thereafter made ready for the next image forming process.

The surface of the transfer material carrying member 11 of the transfer drum 10 is also cleaned by means of a cleaning device 35*a* having a cleaning blade and by the action of an auxiliary cleaning means 35*b*, and thereafter made ready for the next image forming process.

Figure 2:
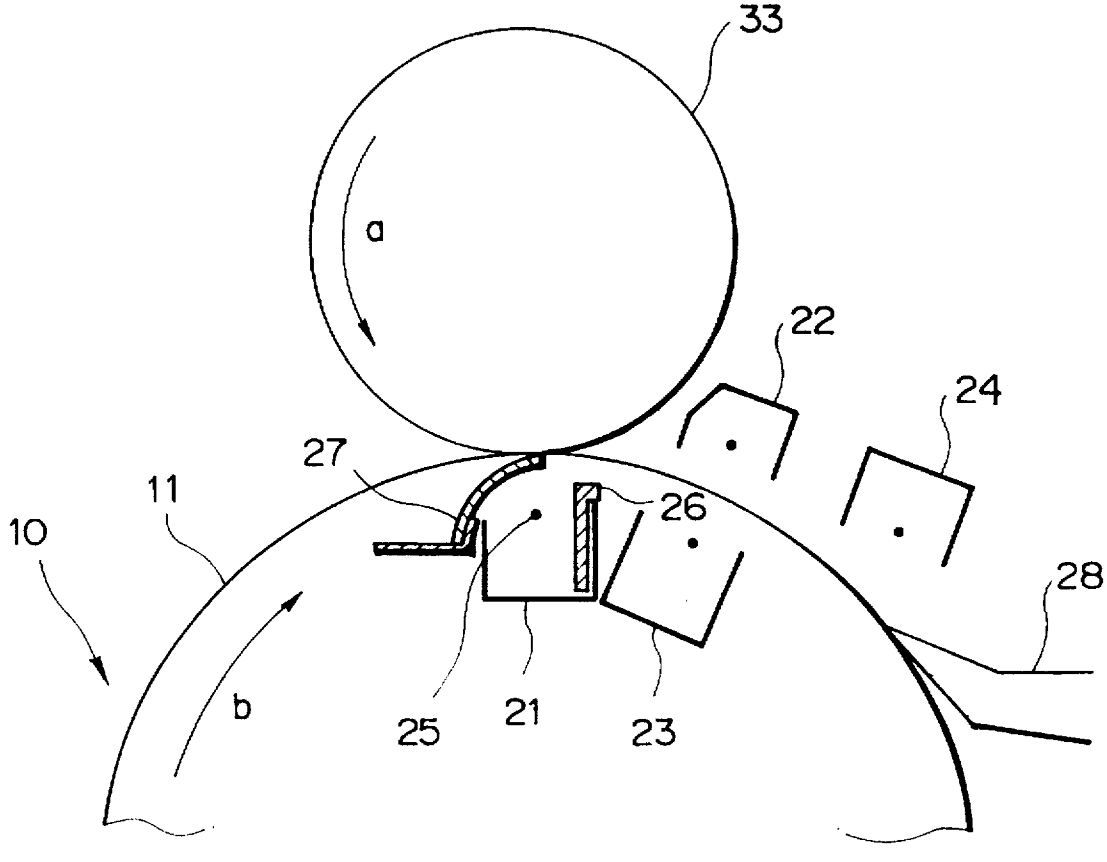
FIG. 2 is a schematic illustration of the construction of a transfer device having the transfer material carrying member of the present invention.

In the present invention, as shown in FIG. 2, an insulating member 26 as exemplified by a polycarbonate resin plate may be provided on a shield plate of the transfer corona discharge assembly 21, located downstream in the direction (the direction of an arrow b) of the rotation of the transfer drum 10 so that a transfer corona toward the photosensitive drum 33 can be in a greater quantity.

In the present invention, an elastic pressure member 27 may preferably be provided which extends from the approach of the transfer material carrying member 11, downstream in the direction of its movement. This pressure member 27 is comprised of a resin as exemplified by polyethylene, polypropylene, polyester or polyethylene terephthalate, preferably having a volume resistivity of not less than $10^{10}$ Ω.cm, and particularly preferably not less than $10^{14}$ Ω.cm, and is provided through the whole area of the transfer zone.

FIG. 4 illustrates an example of an image forming apparatus making use of the transfer material carrying member of the present invention, prepared in the form of an endless belt.

The image forming apparatus shown in FIG. 4 has photosensitive drums 41*a* to 41*d*, around which primary charge assemblies 42*a* to 42*d*, exposure means 43*a* to 43*d*, developing assemblies 44*a* to 44*d*, transfer charge assemblies 45*a* to 45*d*, charge-eliminating discharge assemblies 46*a* to 46*d* and 47*a* to 47*b* and photosensitive drum cleaning devices 48*a* to 48*d* are provided, respectively. An endless belt transfer material carrying member 40 of the present invention is further provided beneath the photosensitive drums in such a manner that it passes through these units, and a transfer material carrying member cleaning device 50 having an urethane blade 49 is provided.

A transfer material P' is fed through paper feed rollers and thereafter transported by means of the endless belt transfer material carrying member 40 through transfer zones in which the respective transfer discharge assemblies 45*a* to 45*d* are provided.

The present invention will be described below in greater detail by giving Examples.

EXAMPLE 1

Using a vented twin-screw extruder, 95 parts by weight of the copolymer obtained in Synthesis Example and 5 parts by weight of conductive particles with a specific surface area of 800 $m^2$/g (Ketjen-black EC, available from Ketjen International Co.) were formed into pellets. The pellets thus obtained were compression-molded to produce a resin film with a thickness of 100 μm.

This resin film had a volume resistivity of $1\times10^{14}$ Ω.cm. The carbon black was very well dispersed, and observation of its average particle diameter revealed that it was 0.2 μm. The average particle diameter was measured by using TEM.

To evaluate the surface lubricity of this resin film, slip characteristics with respect to the urethane blade under a load of 10 g were measured using a surface properties tester (trade name: HEIDON-14; available from Shinto Kagaku K.K.). As a result, an output value of the sensor was 0.3 assuming an output value of a polyethylene terephthalate film as 1. In this instance, the smaller the output value of the sensor is, the smaller the resistance to slip is, i.e., the higher the surface lubricity is.

Using the above resin film, a transfer drum as shown in FIG. 1 was prepared. More specifically, as the transfer material carrying member 11 shown in FIG. 1, the resin film was so provided as to extend between the two aluminum cylinders 12 and 13. The transfer drum 10 was thus prepared. Both ends of the transfer material carrying member were secured to the connecting part 14 connecting the two aluminum cylinders 12 and 13.

In the present Example, the transfer drum 10 were made to have a diameter of 160 mm and set to drive at a speed of 160 mm/sec. At the same time, the speed of process, i.e., the speed of drive of the photosensitive drum 33 and so on was also set to be 160 mm/sec. The transfer corona discharge assembly 21 was set to have an opening width of 19 mm. A discharge wire 25 was set 10.5 mm distant from the surface of the photosensitive drum 33, and also 16 mm distant from the the bottom of the shield plate of the transfer corona discharge assembly 21.

As the pressure member 27, a polyethylene terephthalate resin film was used.

In the present Example, a latent image was formed on the photosensitive drum 33 charged to a negative polarity using the image forming apparatus as shown in FIG. 3, and a toner image was obtained by reversal development using a toner with an average particle diameter of 8 μm. Here, the toner was comprised of a resin, a coloring material and few amounts of other additives for improving charge control properties and surface lubricity, and was chargeable to negative polarity as a result of triboelectric charging by the friction with carrier particles in the developing assembly.

Thereafter, the toner image was transferred to a transfer material by means of the transfer device constructed as described above. Subsequently, the transfer material was separated from the transfer drum 10 and then subjected to image fixing using a fixing assembly.

In the present example, the surface of the transfer material carrying member 11 of the transfer drum 10 was cleaned by means of the cleaning device 35*a* having the urethane blade, and the auxiliary cleaning means 35*b*.

A running test to reproduce images on 10,000 copy sheets was made using the multi-color electrophotographic copying machine constructed as described above. As a result, initial images were good images free from uneven transfer or the like. The same good images were obtainable also after running.

EXAMPLE 2

A transfer material carrying member was prepared in the same manner as in Example 1 except that 1.3 kg of the polydimethylsiloxane (X-22-165B; available from Shin-Etsu Chemical Co., Ltd.) used therein (the copolymer obtained in Synthesis Example) was replaced with 1.3 kg of polydimethylsiloxane terminated at its both ends with 3-(2-hydroxyphenyl)propyl groups and having siloxane chains in an average repeating number n of 40 (BY16-752; available from Toray Dow Corning Silicone Inc.). Evaluation was similarly made.

Results obtained are shown in Table 1.

EXAMPLE 3

A transfer material carrying member was prepared in the same manner as in Example 1 except that 1.3 kg of the polydimethylsiloxane (X-22-165B; available from Shin-Etsu Chemical Co., Ltd.) used therein was replaced with 1.7 kg of polydimethylsiloxane terminated at its both ends with 2-(4-hydroxyphenyl)ethyl groups and having siloxane chains in an average repeating number n of 60 (X-22-165C; available from Shin-Etsu Chemical Co., Ltd.). Evaluation was similarly made.

Results obtained are shown in Table 1.

EXAMPLE 4

A transfer material carrying member was prepared in the same manner as in Example 1 except that 1.3 kg of the polydimethylsiloxane (X-22-165B; available from Shin-Etsu Chemical Co., Ltd.) used therein was replaced with 1.3 kg of polydimethylsiloxane terminated at its both ends with 2-(3-hydroxyphenyl)ethyl groups and having siloxane chains in an average repeating number n of 40 (X-22-2975; available from Shin-Etsu Chemical Co., Ltd.). Evaluation was similarly made.

Results obtained are shown in Table 1.

Comparative Example 1

A transfer material carrying member was prepared in the same manner as in Example 1 except that the copolymer used therein was replaced with 95 parts by weight of polycarbonate resin (IUPILON S-2000; available from Mitsubishi Gas Chemical Company, Inc.). Evaluation was similarly made.

Results obtained are shown in Table 1.

EXAMPLE 5

A copolymer in the present invention was prepared in the same manner as in Example 1 except that 1.3 kg of the polydimethylsiloxane (X-22-165B; available from Shin-Etsu Chemical Co., Ltd.) used therein was replaced with 3.0 kg of polydimethylsiloxane terminated at its both ends with 3-(2-hydroxyphenyl)propyl groups and having siloxane chains in an average repeating number n of 100 (BY16-752E; available from Toray Dow Corning Silicone Inc.), and 38 lit. of methylene chloride was used.

A resin film with a thickness of 150 μm was obtained in the same manner as in Example 1 except that 96 parts by weight of this copolymer and 4 parts by weight of Ketjenblack were used.

The volume resistivity of the resulting resin film and the dispersibility of carbon black were evaluated in the same manner as in Example 1.

Results obtained are shown in Table 1.

This resin film was molded into an endless belt by heat sealing. Using the image forming apparatus as shown in FIG. 4 and the same toner as used in Example 1, images were reproduced to make evaluation. As a result, it was possible to obtain good images free from uneven transfer or the like.

A running test to reproduce images on 10,000 copy sheets was made using the multi-color electrophotographic copying machine described above. As a result, the same good images free from uneven transfer or the like as initial images were obtainable also after running.

EXAMPLE 6

A transfer material carrying member was prepared in the same manner as in Example 5 except that 7.2 kg of the 2,2-bis(4-hydroxyphenyl)propane used therein was replaced with 3.6 kg of 2,2-bis(4-hydroxyphenyl)propane and 3.2 kg of 4,4'-dihydroxydiphenyl ether. Evaluation was similarly made.

Results obtained are shown in Table 1.

EXAMPLE 7

A transfer material carrying member was prepared in the same manner as in Example 6 except that 3.2 kg of the 4,4'-dihydroxydiphenyl ether used therein was replaced with 3.45 kg of 4,4'-dihydroxydiphenyl sulfide. Evaluation was similarly made.

Results obtained are shown in Table 1.

EXAMPLE 8

A transfer material carrying member was prepared in the same manner as in Example 5 except that 7.2 kg of the 2,2-bis(4-hydroxyphenyl)propane used therein was replaced with 3.5 kg of 2,2-bis(4-hydroxyphenyl)propane and 3.3 kg of 4,4'-dihydroxydiphenyl sulfoxide. Evaluation was similarly made.

Results obtained are shown in Table 1.

Comparative Example 2

A transfer material carrying member was prepared in the same manner as in Example 5 except that the copolymer used therein was replaced with a copolymer having the structure represented by the following formula (weight average molecular weight: $5.0\times10^4$).

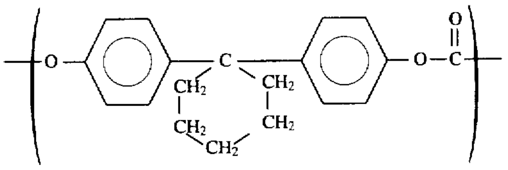

Evaluation was similarly made.

Results obtained are shown in Table 1.

TABLE 1

| | Volume resistivity ($\Omega\cdot cm$) | Carbon black particle diameter ($\mu m$) | Surface lubricity | Image characteristics Initial | After running |
|---|---|---|---|---|---|
| Example: | | | | | |
| 1 | $1.0\times10^{14}$ | 0.2 | 0.30 | Good | Good |
| 2 | $3.5\times10^{14}$ | 0.3 | 0.31 | Good | Good |
| 3 | $2.8\times10^{14}$ | 0.3 | 0.28 | Good | Good |
| 4 | $2.5\times10^{14}$ | 0.2 | 0.35 | Good | Good |
| 5 | $1.0\times10^{14}$ | 0.1 | 0.29 | Good | Good |
| 6 | $9.3\times10^{13}$ | 0.3 | 0.32 | Good | Good |
| 7 | $2.3\times10^{14}$ | 0.2 | 0.35 | Good | Good |
| 8 | $8.8\times10^{13}$ | 0.3 | 0.28 | Good | Good |
| Comparative Example: | | | | | |
| 1 | $2.8\times10^{13}$ | 10.0 | 3.58 | * | * |
| 2 | $1.3\times10^{13}$ | 9.0 | 3.24 | * | * |

*Uneven image occurred.

EXAMPLE 9

Using a tumbling mixer, 70 parts by weight of the copolymer as used in Example 1 and 30 parts by weight of titanium oxide (number average particle diameter: 0.2 μm; conductive powder W-I, available from Mitsubishi Material Co., Ltd.; hereinafter "$TiO_2$") were mixed, and the mixture was formed into pellets using a vented twin-screw extruder. The pellets thus obtained were extruded to produce a sheet with a thickness of 150 μm.

The volume resistivity and surface lubricity of this resin film were evaluated in the same manner as in Example 1.

Light transmittance (at a wavelength of 800 nm) was also measured using a UV measuring apparatus (UV-2200; manufactured by Shimadzu Corporation).

Next, using the above resin film, a transfer drum was prepared in the same manner as in Example 1, which was then mounted on the same electrophotographic apparatus as used therein. Images formed at the initial stage and after running were similarly evaluated.

Results obtained are shown in Table 2.

EXAMPLE 10

$TiO_2$ was immersed in a methylene chloride solution of γ-aminopropyltriethoxysilane (KBE903, available from Shin-Etsu Chemical Co., Ltd.; hereinafter "aminosilane") (concentration: 2%) and thereafter the solvent was removed, followed by drying to give aminosilane-treated $TiO_2$ (hereinafter "$TiO_2$-S").

A transfer material carrying member was prepared in the same manner as in Example 9 except that the $TiO_2$ used therein was replaced with $TiO_2$-S. Evaluation was similarly made.

Results obtained are shown in Table 2.

EXAMPLE 11

A transfer material carrying member was prepared in the same manner as in Example 9 except that 30 parts by weight of the $TiO_2$ used therein was replaced with 30 parts by weight of an indium oxide-tin oxide solid solution (number average particle diameter: 0.2 μm; conductive powder ITO, available from Mitsubishi Material Co., Ltd.; hereinafter "ITO"). Evaluation was similarly made.

Results obtained are shown in Table 2.

EXAMPLE 12

ITO treated with aminosilane (hereinafter "ITO-S) was obtained in the same manner as in Example 10 except that $TiO_2$ used was replaced with ITO. A transfer material carrying member was prepared in the same manner as in Example 9 except that the copolycarbonate resin was used in an amount of 65 parts by weight and the $TiO_2$ was replaced with 35 parts by weight of ITO-S. Evaluation was similarly made.

Results obtained are shown in Table 2.

Comparative Example 3

A transfer material carrying member was prepared in the same manner as in Example 9 except that, in place of the copolycarbonate resin used therein, only a polycarbonate resin (IUPILON S-2000, available from Mitsubishi Gas Chemical Company, Inc.) was extruded into pellets. Evaluation was similarly made.

Results obtained are shown in Table 2.

EXAMPLE 13

A polycarbonate resin film with a thickness of 120 μm was prepared in the same manner as in Example 9 except that the copolycarbonate resin was used in an amount of 60 parts by weight and 30 parts by weight of the $TiO_2$ was replaced with 40 parts by weight of zinc oxide (number average particle diameter: 0.2 μm; zinc oxide conductive powder, available from Mitsui Kinzoku Co., Ltd.; hereinafter "ZnO").

The volume resistivity, surface lubricity and transmittance of this sheet were evaluated in the same manner as in Example 9.

Results obtained are shown in Table 2.

This resin film was molded into an endless belt by heat sealing. Using the image forming apparatus as shown in FIG. 4 and the same toner as used in Example 1, images were reproduced to make evaluation. As a result, it was possible to obtain good images free from uneven transfer or the like.

In the present Example, the jam-detecting sensor set around the transfer device was provided inside the transfer belt.

A running test to reproduce images on 10,000 copy sheets was also made using the multi-color electrophotographic copying machine previously described. Images obtained were visually evaluated. As a result, the same good images free from uneven transfer or the like as initial images were stably obtainable also after running.

EXAMPLE 14

ZnO treated with aminosilane (hereinafter "ZnO-S) was obtained in the same manner as in Example 10 except that $TiO_2$ used was replaced with ZnO.

A transfer material carrying member was prepared in the same manner as in Example 13 except that the copolycarbonate resin was used in an amount of 75 parts by weight and the ZnO was replaced with 25 parts by weight of ZnO-S. Evaluation was similarly made.

Results obtained are shown in Table 2.

TABLE 2

| | Surface lubricity | Volume resistivity (Ω · cm) | Transmittance (%) | Initial images | Images after running |
|---|---|---|---|---|---|
| Example: | | | | | |
| 9 | 0.38 | $1.7 \times 10^{15}$ | 64 | Good | Good |
| 10 | 0.40 | $4.3 \times 10^{15}$ | 67 | Good | Good |
| 11 | 0.35 | $1.6 \times 10^{14}$ | 58 | Good | Good |
| 12 | 0.33 | $3.8 \times 10^{14}$ | 59 | Good | Good |
| 13 | 0.34 | $4.8 \times 10^{14}$ | 52 | Good | Good |
| 14 | 0.39 | $2.2 \times 10^{16}$ | 63 | Good | Good |
| Comparative Example: | | | | | |
| 3 | 3.68 | $9.4 \times 10^{16}$ | 95 | * | * |

*Uneven transfer occurred.

As having been described above, the transfer material carrying member of the present invention has superior dispersion properties, surface electrical characteristics, mechanical strength and transparency. The image forming apparatus making use of the transfer material carrying member enables always good transfer even when copies are repeatedly taken and makes it possible to obtain always stable, good images.

What is claimed is:

1. A transfer material carrying member comprising a sheet formed from a copolymer and conductive particles;

said copolymer being a copolymer having a component unit represented by the following Formula (I) :

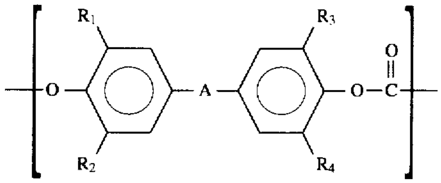
(I)

wherein A represents a straight-chain, branched or cyclic alkylidene group having 1 to 10 carbon atoms, an aryl-substituted alkylidene group, an arylenedialkylidene group, —O—, —S—, —CO—, —SO— or —$SO_2$—; and $R_1$, $R_2$, $R_3$ and $R_4$ each represent a hydrogen atom, a halogen atom, an alkyl group having 1 to 4 carbon atoms, or an alkenyl group, and a component unit represented by the following Formula (II):

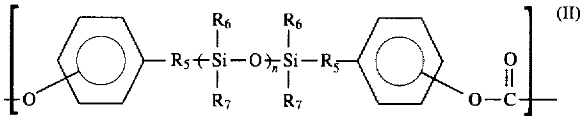
(II)

wherein $R_5$ represents an alkylene group having 2 to 6 carbon atoms, or an alkylidene group; $R_6$ and $R_7$ each represent an alkyl group having 1 to 3 carbon atoms, a phenyl group or a substituted phenyl group; and n represents an integer of 1 to 200; and said component unit represented by Formula (II) being in an amount of from 0.1% by weight to 50% by weight based on the total weight of said copolymer.

2. A transfer material carrying member according to claim 1, wherein said component unit represented by Formula (I) is represented by the following formula:

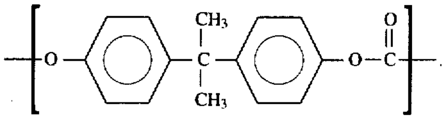

3. A transfer material carrying member according to claim 1, wherein said component unit represented by Formula (I) is represented by the following formula:

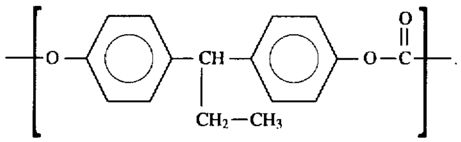

4. A transfer material carrying member according to claim 1, wherein said component unit represented by Formula (I) is represented by the following formula:

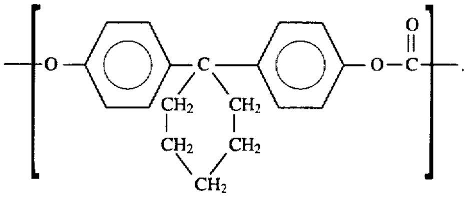

5. A transfer material carrying member according to claim 1, wherein said component unit represented by Formula (I) is represented by the following formula:

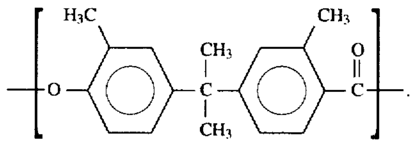

6. A transfer material carrying member according to claim 1, wherein said component unit represented by Formula (I) is represented by the following formula:

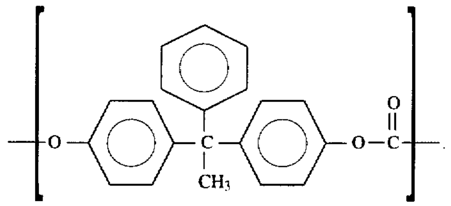

7. A transfer material carrying member according to claim 1, wherein said component unit represented by Formula (I) is represented by the following formula:

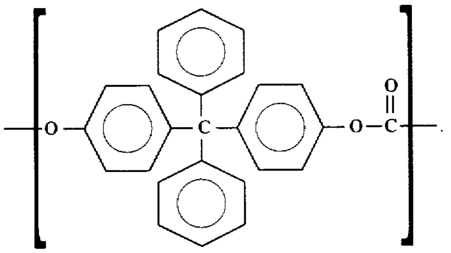

8. A transfer material carrying member according to claim 1, wherein said component unit represented by Formula (II) is in an amount of from 0.1% by weight to 30% by weight based on the total weight of said copolymer.

9. A transfer material carrying member according to claim 1, wherein said n is 5 to 100.

10. A transfer material carrying member according to claim 1, wherein said $R_5$ is selected from the group consisting of an ethylene, propylene or isopropylene group.

11. A transfer material carrying member according to claim 1, wherein said copolymer contains two or more kinds of said component unit represented by Formula (I).

12. A transfer material carrying member according to claim 1, wherein said copolymer contains two or more kinds of said component unit represented by Formula (II).

13. A transfer material carrying member according to claim 1, wherein said conductive particles are conductive carbon black.

14. A transfer material carrying member according to claim 1, wherein said conductive particles are metal oxide particles.

15. A transfer material carrying member according to claim 1, wherein said conductive particles have a number average particle diameter of 1 μm or less.

16. A transfer material carrying member according to claim 15, wherein said conductive particles have a number average particle diameter of 0.3 μm or less.

17. A transfer material carrying member according to claim 1, wherein said conductive particles have a volume resistivity of 100 Ω.cm or less.

18. A transfer material carrying member according to claim 17, wherein said conductive particles have a volume resistivity of 70 Ω.cm or less.

19. A transfer material carrying member according to claim 1, wherein said conductive particles are contained in an amount of from 0.1 part by weight to 300 parts by weight based on 100 parts by weight of said copolymer contained in said transfer material carrying member.

20. A transfer material carrying member according to claim 13, wherein said conductive carbon black is contained in an amount of from 0.1 part by weight to 300 parts by weight based on 100 parts by weight of said copolymer contained in said transfer material carrying member.

21. A transfer material carrying member according to claim 14, wherein said metal oxide particles are contained in an amount of from 1 part by weight to 300 parts by weight based on 100 parts by weight of said copolymer contained in said transfer material carrying member.

22. A transfer material carrying member according to claim 21, wherein said metal oxide particles are contained in an amount of from 3 parts by weight to 100 parts by weight based on 100 parts by weight of said copolymer contained in said transfer material carrying member.

23. A transfer material carrying member according to claim 1, wherein said sheet has a volume resistivity of from $1\times10^{2}$ Ω.cm to $1\times10^{17}$ Ω.cm.

24. A transfer material carrying member according to claim 1, wherein said sheet has a specific dielectric constant of not less than 2.5.

25. A transfer material carrying member according to claim 1, wherein said sheet is in the form of an endless belt.

26. A transfer material carrying member according to claim 1, wherein said sheet is in a thickness of from 50 μm to 300 μm.

27. A transfer material carrying member according to claim 26, wherein said sheet is in a thickness of from 70 μm to 200 μm.

* * * * *

UNITED STATES PATENT AND TRADEMARK OFFICE

CERTIFICATE OF CORRECTION

PATENT NO. : 5,534,581

DATED : July 9, 1996

INVENTOR(S) : NORIKO OHTANI ET AL.

It is certified that error appears in the above-indentified patent and that said Letters Patent is hereby corrected as shown below:

COLUMN 2

Line 53, "$SO_2$;" should read -- -$SO_2$-;--.

COLUMN 3

Line 52, "$R_5$ and $R_7$" should read --$R_5$ to $R_7$--.
Line 64, "burlylane," should read --butylene,--.

COLUMN 6

Line 51, "ape" should read --are--.

COLUMN 9

Line 28 "cab" should read --can--.
Line 32, "uneve-" should read --uneven- --.
Line 44, "forming" should read --image forming--.

COLUMN 10

Line 4, "end" should read --and--.
Line 6, "end" should read --and--.
Line 11, "mope" should read --more--.

COLUMN 12

Line 4, "47b" should read --47d--.
Line 10, "an" shoudl read --a--.

UNITED STATES PATENT AND TRADEMARK OFFICE

CERTIFICATE OF CORRECTION

PATENT NO. : 5,534,581

DATED : July 9, 1996

INVENTOR(S) : NORIKO OHTANI ET AL.

It is certified that error appears in the above-indentified patent and that said Letters Patent is hereby corrected as shown below:

COLUMN 17

Line 42, "sheet" should read --sheet for supporting transfer material--.

COLUMN 18

Line 1, "$R_3$" should read --$R_5$--.

Signed and Sealed this

Tenth Day of December, 1996

Attest:

BRUCE LEHMAN

Attesting Officer

Commissioner of Patents and Trademarks